W. G. FLANDERS.
Steam Cooking-Kettle.
No. 197,113.    Patented Nov. 13, 1877.
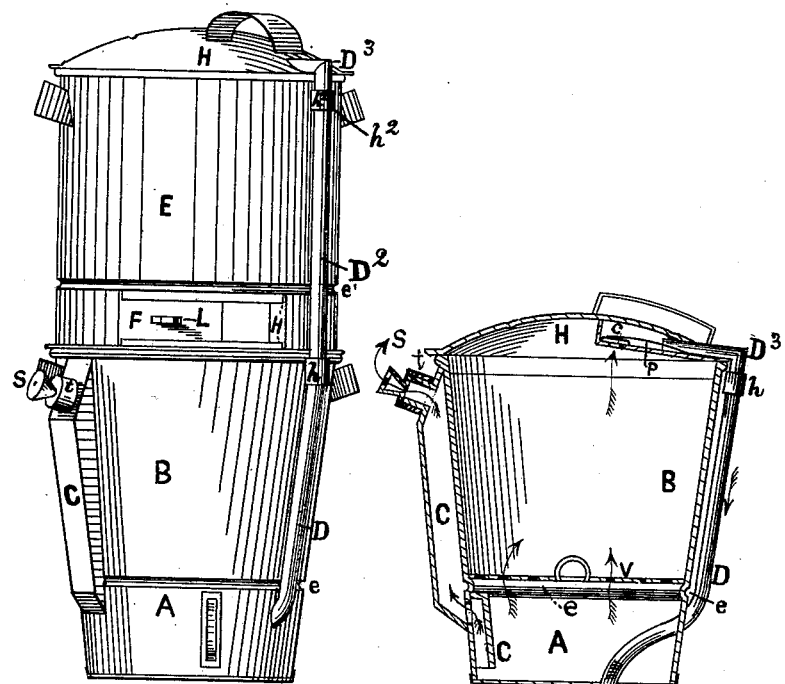
Fig. 1.    Fig. 2.
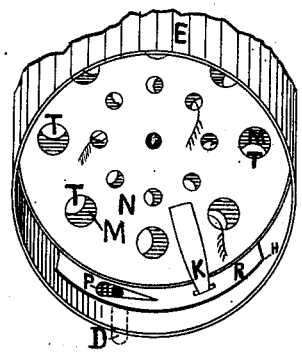    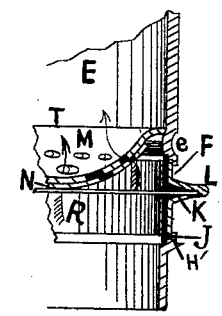
Fig. 3.    Fig. 4.
Witnesses:    Inventor:
H. S. Talbot    William G. Flanders,
W. R. Marble    By Sylvenus Walker
    Atty

UNITED STATES PATENT OFFICE.

WILLIAM G. FLANDERS, OF BOSTON, MASSACHUSETTS.

IMPROVEMENT IN STEAM COOKING-KETTLES.

Specification forming part of Letters Patent No. 197,113, dated November 13, 1877; application filed April 23, 1877.

*To all whom it may concern:*

Be it known that I, WILLIAM G. FLANDERS, of Boston, in the county of Suffolk and State of Massachusetts, have invented certain new and useful Improvements in Steam Cooking-Kettles, of which the following is a specification:

The object of my invention is to furnish an improved utensil for cooking food by steam, which shall be so constructed as to enable large or small articles to be cooked, or several articles to be cooked at the same time; which will enable articles in one part to be inspected, put in, and taken out without disturbing the articles in the other part, and also permit the steam to be partially shut off from the upper part, or entirely so, if desired, without creating excessive pressure in the lower part; furthermore, in an alarm or indicator that the water in the boiler has evaporated to a point that safety requires it to be replenished, which can be accomplished without escape of steam.

Figure 1 is a perspective view of a steam cooking-kettle embodying my invention. Fig. 2 is a vertical section of the lower portion of my improved steam cooking-kettle. Fig. 3 is a view of the bottom of the upper steam-chamber and its rotary register. Fig. 4 is a vertical section of a portion of same.

A is the boiler portion of the lower part of the utensil, which is made with its lower end somewhat larger than the boiler-hole over which it is to be placed, or a pressed bottom to fit the boiler-hole may be used, if desired. B is the lower steam-chamber, being provided with a perforated disk or plate, V, upon which the food is placed to be steamed. This plate V rests upon an inwardly-projecting bead, $e$, formed in the sides of the part A B, below the center.

C is a water-supply tube, attached to the outside of the steam-chamber B, and extending downward to the boiler portion A, where it enters the side of the utensil, and thence downward upon the inside of the boiler A to within about one-half of an inch of the bottom of the same, where it terminates.

To the top of the supply-tube C is affixed a cap, $t$, which may be removed to renew the water in the boiler, which, when evaporated or boiled away nearly, leaving the lower end of the supply-tube C open, the steam enters the same and ascends to the cap $t$, which is provided with a whistle, S, through which the steam escapes, which indicates low water to the cook or attendant.

To the side of the kettle or steam-chamber B is attached a steam-escape tube, D, near the upper end of which is connected a short tube or opening, which communicates with the interior of the steam-chamber B. To the top of this tube D is fitted a socket, $h$, which receives the end of a similar steam-escape tube, $D^2$, which is attached to and connects with the upper detachable steam-chamber E, near its top, and is provided with a socket, $h^2$. This socket receives the end of the short steam-escape tube $D^3$, which is connected to the cover H, and communicates with the interior of the same through the valve $c$, which is held closed against any air, smoke, or foul odors arising from within the stove, and entering the lower end of the steam-escape tube D, which opens into the same, after passing through the side and bottom of the boiler A, as shown in Fig. 2. This valve $c$ in the cover H may be held closed by a light spring, $p$; or a weighted valve may be employed, if desired. This cover H, with its valve and escape-tube, may be placed directly upon the top of the lower part or steam-chamber B when a steam-kettle of smaller capacity is desired, as shown in Fig. 2, the upper part or steam-chamber E being disconnected from the lower portion of the utensil. Near the bottom of the steam-chamber E is attached a slide, F, which may be moved back and forth in grooves H', secured to the outside of the same by means of the projection L, which is provided with a cavity opening inwardly to receive the end of the bar K, which passes through a slot in the side of the steam-chamber E, which slot is of sufficient length to allow the bar K to move a sufficient distance to operate or open and close the rotary register, composed of two perforated plates or disks, N M, which are pivoted together at their centers, so as to permit the movement of the bar K, which is secured to one of them, to rotate it upon the other one a sufficient distance to open and close the perforations or openings T through said plates more or less, as may be desired to regulate the amount of steam passing into the upper steam-chamber E; and in order to keep up a uniform pressure of steam within each steam-chamber, and to gradually check or close its passage to the upper one, and allow it to pass out of the lower one to the steam-escape tube D, a slide, R, is attached to the inside of the upper chamber E, directly opposite the slide F, and moving in similar grooves J. This slide R has an opening, through which the bar K passes; also, another opening, P, tapering to a point, which opening allows the steam to escape to the tube D, which communicates with the steam-chamber B at this point. This construction of the tapering opening P in the slide R gradually opens and closes the steam-passage to the tube D at this point correspondingly as the openings T in the register-plates N M are closed and opened, so when the register N M is closed the steam has free escape to the tube D; thus allowing articles of food in the steam-chamber E to be inspected, put in, or taken out without disturbing that in the lower chamber B, a perforated disk or plate, W, being placed over the register N M to place the food upon to be steamed, so as to keep it from interfering with the operation of the register when being moved.

Having thus described my invention, what I claim is—

1. The double-chambered culinary vessel, made in detachable parts A, B, and E, each provided with a steam-escape pipe, D, and the upper part E having a rotary register composed of two perforated plates, N M, one of which may be rotated to close the apertures therein, as shown and described, for the purposes specified.

2. In combination with the cover H of the boiler, the self-closing valve c, as constructed to open by the pressure of steam within the boiler, and allow its escape through the tube D into the fire, and prevent the passage of odors through said tube and valve in the opposite direction, substantially as and for the purposes set forth.

3. In combination with the rotary register N M and bar K, the slides F and R, the latter having a tapering opening, P, arranged to operate with the steam-escape tube D, substantially in the manner described, as and for the purposes set forth.

WM. G. FLANDERS.

Witnesses:
SYLVENUS WALKER,
W. M. PARKER.